United States Patent [19]

Kishi et al.

[11] Patent Number: 4,587,608
[45] Date of Patent: May 6, 1986

[54] METHOD OF AUTOMATICALLY CREATING NUMERICAL CONTROL DATA IN ONE OF A PLURALITY OF DATA FORMATS

[75] Inventors: Hajimu Kishi; Kunio Tanaka, both of Tokyo, Japan

[73] Assignee: Fanuc Ltd., Hino, Japan

[21] Appl. No.: 626,879

[22] PCT Filed: Oct. 29, 1983

[86] PCT No.: PCT/JP83/00390

§ 371 Date: Jun. 27, 1984

§ 102(e) Date: Jun. 27, 1984

[87] PCT Pub. No.: WO84/01840

PCT Pub. Date: May 10, 1984

[30] Foreign Application Priority Data

Oct. 30, 1982 [JP] Japan ............................. 57-191238

[51] Int. Cl.⁴ ........................................... G05B 19/403
[52] U.S. Cl. ..................................... 364/191; 364/171
[58] Field of Search ............... 364/191, 192, 171, 146, 364/188, 189, 474, 475, 513

[56] References Cited

U.S. PATENT DOCUMENTS 4,490,781 12/1984 Kishi et al. .......................... 364/147

Primary Examiner—Jerry Smith
Assistant Examiner—Allen MacDonald
Attorney, Agent, or Firm—Staas & Halsey

[57] ABSTRACT

A method of automatically creating numerical control data comprises providing a number of parameters used for specifying a machining pattern and a number of function codes designated by the parameters for creating numerical control data. Storing in a memory the correspondence between each of the function codes and a numerical control data output format; storing in a memory the correspondence between each parameter and one or more function codes designated by said parameter. The method also includes applying parameters sequentially from a machining pattern information output unit to a processor in accordance with NC machining, and creating numerical control data by using function codes designated by the parameters.

7 Claims, 7 Drawing Figures

Fig. 3(A)

| PARAMETER NO. | MEANING | PARAMETER NO. | MEANING |
|---|---|---|---|
| 2000 | PARAMETER FOR CREATING LEADER PORTION OF NC DATA | 2015 | NC DATA CREATION PARAMETER AT END OF THREAD CUTTING PROCESS |
| 2001 | PARAMETER FOR CREATING TRAILER PORTION OF NC DATA | 2016 | PARAMETER FOR SETTING COORDINATE SYSTEM OR FOR OUTPUTTING TOOL SELECTION NC DATA |
| 2002 | NC DATA CREATION PARAMETER AT BEGINNING OF CENTER DRILLING PROCESS | 2017 | NC DATA CREATION PARAMETER FOR RAPID TRAVERSE OR CUTTING FEED |
| 2003 | NC DATA CREATION PARAMETER AT BEGINNING OF DRILLING PROCESS | | |
| 2004 | NC DATA CREATION PARAMETER AT BEGINNING OF ROUGH MACHINING PROCESS | 2018 | NC DATA CREATION PARAMETER FOR APPROACH BASED ON TWO AXES SIMULTANEOUSLY |
| 2005 | NC DATA CREATION PARAMETER AT BEGINNING OF INTERMEDIATE FINISHING PROCESS | 2019 | NC DATA CREATION PARAMETER FOR RETRACTION MOVEMENT BASED ON TWO AXES SIMULTANEOUSLY |
| 2006 | NC DATA CREATION PARAMETER AT BEGINNING OF FINISHING PROCESS | | |
| 2007 | NC DATA CREATION PARAMETER AT BEGINNING OF GROOVING PROCESS | 2020 | NC DATA CREATION PARAMETER FOR CIRCULAR INTERPOLATION |
| 2008 | NC DATA CREATION PARAMETER AT BEGINNING OF THREAD CUTTING PROCESS | 2021 | NC DATA CREATION PARAMETER FOR CIRCULAR INTERPOLATION |
| 2009 | NC DATA CREATION PARAMETER AT END OF CENTER DRILLING PROCESS | 2022 | NC DATA CREATION PARAMETER FOR THREAD CUTTING |
| 2010 | NC DATA CREATION PARAMETER AT END OF DRILLING PROCESS | 2023 | NC DATA CREATION PARAMETER FOR COMMANDING THREAD CUTTING CYCLE |
| 2011 | NC DATA CREATION PARAMETER AT END OF ROUGH MACHINING PROCESS | 2024 | NC DATA CREATION PARAMETER FOR COMMANDING SPINDLE RPM |
| 2012 | NC DATA CREATION PARAMETER AT END OF INTERMEDIATE FINISHING PROCESS | 2025 | NC DATA CREATION PARAMETER FOR CHANGING OVER SPINDLE STAGE NUMBER |
| 2013 | NC DATA CREATION PARAMETER AT END OF FINISHING PROCESS | 2026 | NOT USED |
| 2014 | NC DATA CREATION PARAMETER AT END OF GROOVING PROCESS | | |

Fig. 3(B)

| PARAMETER NUMBER | MEANING |
|---|---|
| 2027 | NC DATA CREATION PARAMETER FOR DWELL COMMAND |
| 2028 | NC DATA CREATION PARAMETER FOR TURNING ON CONSTANT PERIPHERAL SPEED CONTROL |
| 2029 | NOT USED |
| 2030 | NC DATA CREATION PARAMETER FOR SPINDLE MAXIMUM SPEED CLAMP VALUE COMMAND |
| 2031 | NC DATA CREATION PARAMETER FOR FIRST MOTION OF APPROACH BASED ON ONE AXIS SIMULTANEOUSLY |
| 2032 | NC DATA CREATION PARAMETER FOR SECOND MOTION OF APPROACH BASED ON ONE AXIS SIMULTANEOUSLY |
| 2033 | NC DATA CREATION PARAMETER FOR FIRST MOTION OF RETRACTION BASED ON ONE AXIS SIMULTANEOUSLY |
| 2034 | NC DATA CREATION PARAMETER FOR SECOND MOTION OF RETRACTION BASED ON ONE AXIS SIMULTANEOUSLY |

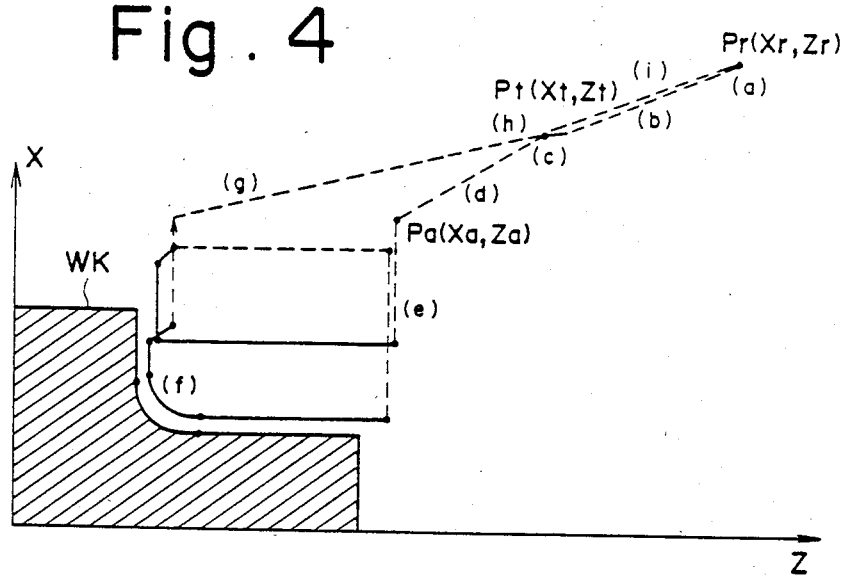

| P | F1 | F2 | F3 | F4 | F5 | F6 | F7 | F8 | F9 |
|---|---|---|---|---|---|---|---|---|---|
| 2000 | 0300 | 0104 | 0004 | 0603 | 0004 | 0000 | 0000 | 0000 | 0000 |
| 2001 | 0205 | 0004 | 0703 | 0004 | 0505 | 0004 | 0104 | 0004 | 0300 |
| 2002 | 0100 | 0000 | 0000 | 0000 | 0000 | 0000 | | | |
| 2003 | 0100 | 0000 | 0000 | 0000 | 0000 | 0000 | | | |
| 2004 | 0100 | 0000 | 0000 | 0000 | 0000 | 0000 | | | |
| 2005 | 0100 | 0000 | 0000 | 0000 | 0000 | 0000 | | | |
| 2006 | 0100 | 0000 | 0000 | 0000 | 0000 | 0000 | | | |
| 2007 | 0100 | 0000 | 0000 | 0000 | 0000 | 0000 | | | |
| 2008 | 0100 | 0000 | 0000 | 0000 | 0000 | 0000 | | | |
| 2009 | 0003 | 0004 | 0605 | 0004 | 0000 | 0000 | | | |
| 2010 | 0003 | 0004 | 0605 | 0004 | 0000 | 0000 | | | |
| 2011 | 0003 | 0004 | 0605 | 0004 | 0000 | 0000 | | | |
| 2012 | 0003 | 0004 | 0605 | 0004 | 0000 | 0000 | | | |
| 2013 | 0003 | 0004 | 0605 | 0004 | 0000 | 0000 | | | |
| 2014 | 0003 | 0004 | 0605 | 0004 | 0000 | 0000 | | | |
| 2015 | 0003 | 0004 | 0605 | 0004 | 0000 | 0000 | | | |
| 2016 | 4402 | 1101 | 0001 | 0303 | 0004 | 0002 | 0103 | 0004 | |
| 2017 | 0000 | 0000 | 5202 | 5002 | 1101 | 0001 | 0503 | 0004 | |
| 2018 | 5202 | 5002 | 1101 | 0001 | 0000 | 0305 | 0004 | 0000 | 0000 |
| 2019 | 5202 | 5002 | 1101 | 0001 | 0000 | 0405 | 0004 | 0000 | 0000 |
| 2020 | 5202 | 5102 | 1101 | 0001 | 4401 | 3301 | 0503 | 0004 | 0000 |
| 2021 | 5202 | 5102 | 1101 | 0001 | 9901 | 0503 | 0004 | 0000 | |
| 2022 | 5202 | 0402 | 1101 | 0001 | 6601 | 0004 | 0000 | | |
| 2023 | 0502 | 1101 | 0001 | 4401 | 6601 | 0004 | 0000 | | |
| 2024 | 0002 | 0105 | 0004 | 1005 | 0203 | 0005 | 0004 | | |
| 2025 | 0002 | 0205 | 0004 | 0006 | 0004 | 0000 | 0000 | 0000 | |
| 2026 | 0000 | 0000 | 0000 | 0000 | 0000 | 0000 | 0000 | | |
| 2027 | 4002 | 8801 | 0004 | 0000 | | | | | |
| 2028 | 0105 | 0004 | 0006 | 0004 | 1102 | 0403 | 0005 | 0004 | 0000 |
| 2029 | 1002 | 0203 | 0004 | 0000 | 0000 | 0000 | 0000 | | |
| 2030 | 4402 | 0303 | 0004 | 0000 | | | | | |
| 2031 | 5202 | 5002 | 1101 | 0001 | 0000 | 0305 | 0004 | 0000 | 0000 |
| 2032 | 5202 | 5002 | 1101 | 0001 | 0000 | 0305 | 0004 | 0000 | 0000 |
| 2033 | 5202 | 5002 | 1101 | 0001 | 0000 | 0405 | 0004 | 0000 | 0000 |
| 2034 | 5202 | 5002 | 1101 | 0001 | 0000 | 0405 | 0004 | 0000 | 0000 |

Fig. 6

| FUNCTION CODE | NC DATA OUTPUT FORMAT |
|---|---|
| 0 0 0 0 | NO FUNCTION |
| X X 0 0 | FEED OUTPUT   XX UNIT FEED OUTPUT |
| 0 0 0 1 | Z-AXIS POSITION DATA OUTPUT |
| 1 1 0 1 | X-AXIS POSITION DATA OUTPUT |
| 3 3 0 1 | Z-AXIS POSITION DATA OUTPUT FOR CENTER OF CIRCULAR ARC |
| 4 4 0 1 | X-AXIS POSITION DATA OUTPUT FOR CENTER OF CIRCULAR ARC |
| ⋮ | ----- |
| 0 0 0 2 | G-CODE OUTPUT FOR POSITIONING                 G00 |
| 1 0 0 2 | G-CODE OUTPUT FOR LEFT-SIDE OUTPUT            G97 |
| 4 4 0 2 | G-CODE OUTPUT FOR SETTING COORDINATE SYSTEM G50 |
| 5 0 0 2 | G-CODE OUTPUT FOR POSITIONING OR LINEAR CUTTING  G00 or G01 |
| 5 1 0 2 | G-CODE OUTPUT FOR CLOCKWISE OR COUNTER-CLOCKWISE CIRCULAR ARC CUTTING  G02 OR G03 |
| 5 2 0 2 | G-CODE OUTPUT FOR ABSOLUTE OR INCREMENTAL COMMAND  G90 or G91 |
| 0 0 0 3 | G-CODE OUTPUT FOR TOOL OFFSET CANCEL          G40 |
| 0 1 0 3 | T-CODE OUTPUT                T□□ |
| 0 2 0 3 | S-CODE OUTPUT                S□□ |
| 0 3 0 3 | MAXIMUM RPM CLAMP VALUE S-CODE OUTPUT |
| 0 5 0 3 | F-CODE OUTPUT                F□□ |
| 0 6 0 3 | PROGRAM NUMBER OUTPUT |
| ⋮ | ⋮ |
| 0 0 0 4 | EOB (END OF BLOCK) OUTPUT    EOB |
| 0 1 0 4 | EOR (REWIND STOP CODE) OUTPUT    % |
| ⋮ | |
| 0 0 0 5 | M-CODE OUTPUT FOR FORWARD ROTATION OF SPINDLE M03 |
| 0 1 0 5 | M-CODE OUTPUT FOR STOPPING SPINDLE       M05 |
| 0 3 0 5 | M-CODE OUTPUT FOR TURNING COOLANT ON     M08 |
| 0 4 0 5 | M-CODE OUTPUT FOR TURNING COOLANT OFF    M09 |
| 0 6 0 5 | OPTIONAL STOP OUTPUT                     M01 |
| ⋮ | ⋮ |
| 0 0 0 6 | M-CODE OUTPUT FOR SPINDLE RANGE SELECTION |
| ⋮ | ⋮ | even 4,587,608

METHOD OF AUTOMATICALLY CREATING NUMERICAL CONTROL DATA IN ONE OF A PLURALITY OF DATA FORMATS

CROSS REFERENCE TO RELATED APPLICATION

The subject application is related to copending U.S. patent application having U.S. Ser. No. 626,880.

BACKGROUND OF THE INVENTION

This invention relates to a method of automatically creating numerical control data and, more particularly, to a numerical control data automatic creation method wherein an NC tape format can be changed with ease.

A numerical control apparatus (NC apparatus) controls a machine tool on the basis of commanded numerical control data (NC data) in order to machine a workpiece in conformance with a command. The NC data (also referred to as an NC tape) is created by programming performed by a programmer, or by a unit for creating NC data automaticaly. With an NC data automatic creation unit, even NC data for a complicated metal mold can be created. The NC data automatic creation unit is designed so that NC data can be created simply and in a short period of time.

In the conventional method of creating NC data, the NC tape format cannot be readily changed. In other words, the conventional NC data creation method can create an NC tape in accordance with one format but not in accordance with another. Therefore, when an NC tape format is desired to be changed in order to add a special function to a machine tool or to have a machine tool execute control tailored to a particular user, the user must purchase a separate NC data creation unit for the new NC format. Consequently, the user is compelled to prepare an NC data creation unit whenever the format of the NC data changes, and the maker of the NC data creation unit must supply NC data creation units having different formats.

SUMMARY OF THE INVENTION

Accordingly, an object of the present invention is to provide an automatic NC data creation method wherein NC tapes can be created for different formats.

Another object of the present invention is to provide an automatic NC data creation method wherein an output NC tape format can be changed with ease.

A further object of the present invention is to provide an automatic NC data creation method through which NC tapes having different formats can be created by a single NC data automatic creation unit, so that NC data creating units need not be prepared for different formats.

The present invention provides an automatic NC data creation method in which an NC tape format can be easily changed. The method includes the steps of providing a number of parameters used for specifying a machining pattern and a number of function codes designated by the parameters for creating numerical control data; storing the correspondence between each of the function codes and a numerical control data output format; and storing the correspondence between each parameter and one or more function codes designated by the parameter. The method also includes generating the parameters sequentially in accordance with NC machining, and creating numerical control data using function codes designated by the parameters. According to the present invention, an NC data format can be changed with ease by changing a function code designated by a parameter.

BRIEF DESCRIPTION OF THE DRAWINGS

FIGS. 3(A) and 3(B) illustrate the relation between various parameter numbers and their meanings according to the present invention;

FIG. 4 illustrates a machining pattern for a turning machine;

FIG. 5 illustrates the correlation between parameter numbers and various function codes; and FIG. 6 illustrates the correlation between function codes and NC data output formats.

DESCRIPTION OF THE PREFERRED EMBODIMENT

Figure 1:
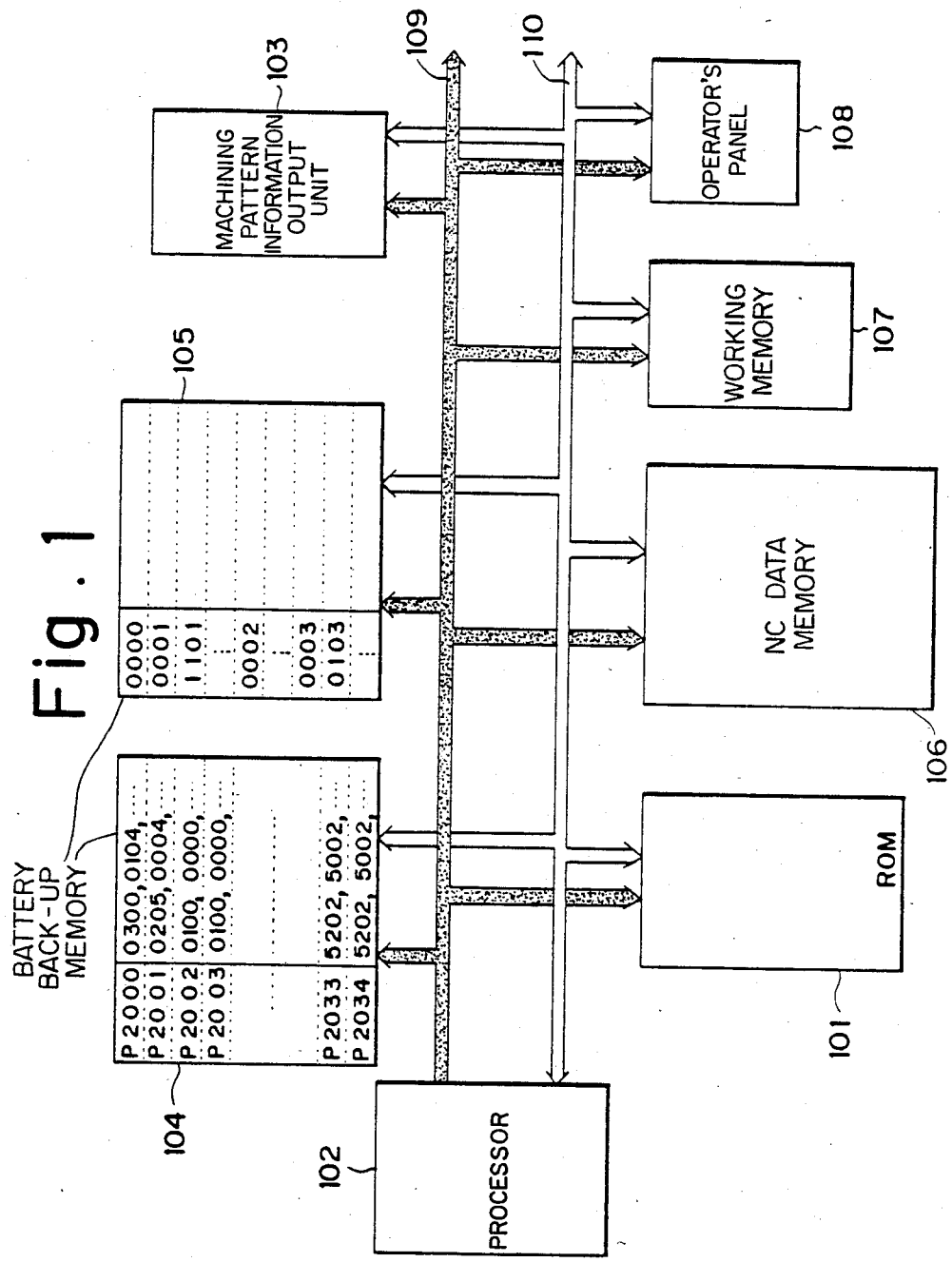
FIG. 1 is a block diagram illustrating an embodiment of the present invention.

FIG. 1 is a block diagram illustrating an embodiment of the present invention. Numeral 101 denotes a ROM which stores a control program for NC data creation, reference numeral 102 identifies a processor for executing predetermined processing under the control of the control program, and 103 a machining pattern information output unit for specifying a general machining pattern. As will be described later, a machining pattern is expressed by parameter numbers P2000 through P2034, positional data, tool numbers, spindle r.p.m., etc. For a lathe, the parameter numbers have the meanings shown in FIGS. 3(A) and 3(B). By combining these parameter numbers, the general nature of a machining pattern can be expressed.

By way of example, the following expresses the machining pattern shown in FIG. 4. This pattern moves a tool from a machine reference point Pr to a tool change point Pt; changes the tool at the tool change point; rotates a spindle at a predetermined speed; and thereafter causes the tool to approach a point Pa and subsequently perform rough cutting along a cutting path comprising straight lines and circular arcs. The tool is then moved to the change point Pt upon completion of rough cutting, and finally the tool is moved to the machine reference point.

| | | |
|---|---|---|
| P2000 | ⎫ | ... (a) |
| P2016 | ⎭ | |
| P2017 | | ... (b) |
| P2004 | ⎫ | |
| P2016 | ⎬ | ... (c) |
| P2024 | ⎭ | |
| P2018 | | ... (d) |
| P2017 | | ... (e) |
| P2020 | | ... (f) |
| P2019 | | ... (g) |
| P2011 | | ... (h) |

In the above, (a) through (i) correspond to (a) through (i) in FIG. 4. Specifically, parameter number P2000 of (a) indicates that an NC data leader portion is to be created, and parameter number P2016 of (a) indicates that a coordinate system is to be set. Parameter number P2017 of (b) indicates that the tool is to be moved from the machine reference point Pr to the tool change point Pt, which parameter number P2004 of (c)

indicates that NC data for outer diameter rough cutting are to be created. Parameter number P2916 of (c) indicates that NC data (T-function instruction) for a tool change are to be created, parameter number P2024 of (c) indicates that NC data (S-function instruction) for selecting spindle speed are to be created; parameter number P2018 of (d) indicates that NC data for moving the tool to the approach point Pa and for turning on a coolant are to be created; and parameter P2017 of (e) indicates that NC data for linear cutting are to be created. Parameter P2019 of (g) indicates that NC data for retracting the tool to the tool change point Pt and for turning the off the coolant are to be created; parameter number P2011 of (h) indicates that NC data for processing following outer diameter rough machining are to be created; and parameter number P2017 of (i) indicates that NC data for moving the tool to the machine reference point Pr are to be created.

Returning to FIG. 1, numeral 104 denotes a battery-backed RAM for storing the correspondence between each of the parameter numbers P2000 through P2034 and one or more function codes indicated by the parameter numbers. FIG. 5 illustrates the relation between parameter numbers for a lathe and a plurality of function codes F1 through F9 indicated by the parameter numnumbers. A function code is expressed by a four-digit hexadecimal number and specifies the format of the output NC data. The rightmost digit 0—A of a function code indicates the general category, while the three leftmost digits indicate the particular category. Further, the following values for the rightmost digit of 0 signifies an output have meanings as follows NC data for a special code; 1 signifies an output of NC data for movement; 2 signifies an output; a G-code, of 3 signifies an output of an F-code for feed speed, an output of an S-code for spindle speed selection and an output of a T-code for a tool change; 4 signifies an output of a special code; 5 signifies an output of an M-code; 6 signifies an output of a special M-code; 7 signifies an output of a code of value 0; 8 signifies an output of any M-code other than the M-codes output in accordance with the rightmost digits of 5 and 6; 9 signifies an output of any S-code, and A signifies an output of any T-code.

Numeral 105 designates a battery-backed RAM for storing the correspondence between each of the function codes an an NC data output format. Such correspondence is illustrated in FIG. 6. Though FIG. 6 shows only the correspondence between function codes needed to create NC data for the turning machining pattern of FIG. 4 and the NC data output formats, many other function codes can be stored without being limited to those shown. Numeral 106 denotes an NC data memory for storing the NC data created, 107 a working memory, and numeral 108 denotes an operator's panel.

Figure 2:
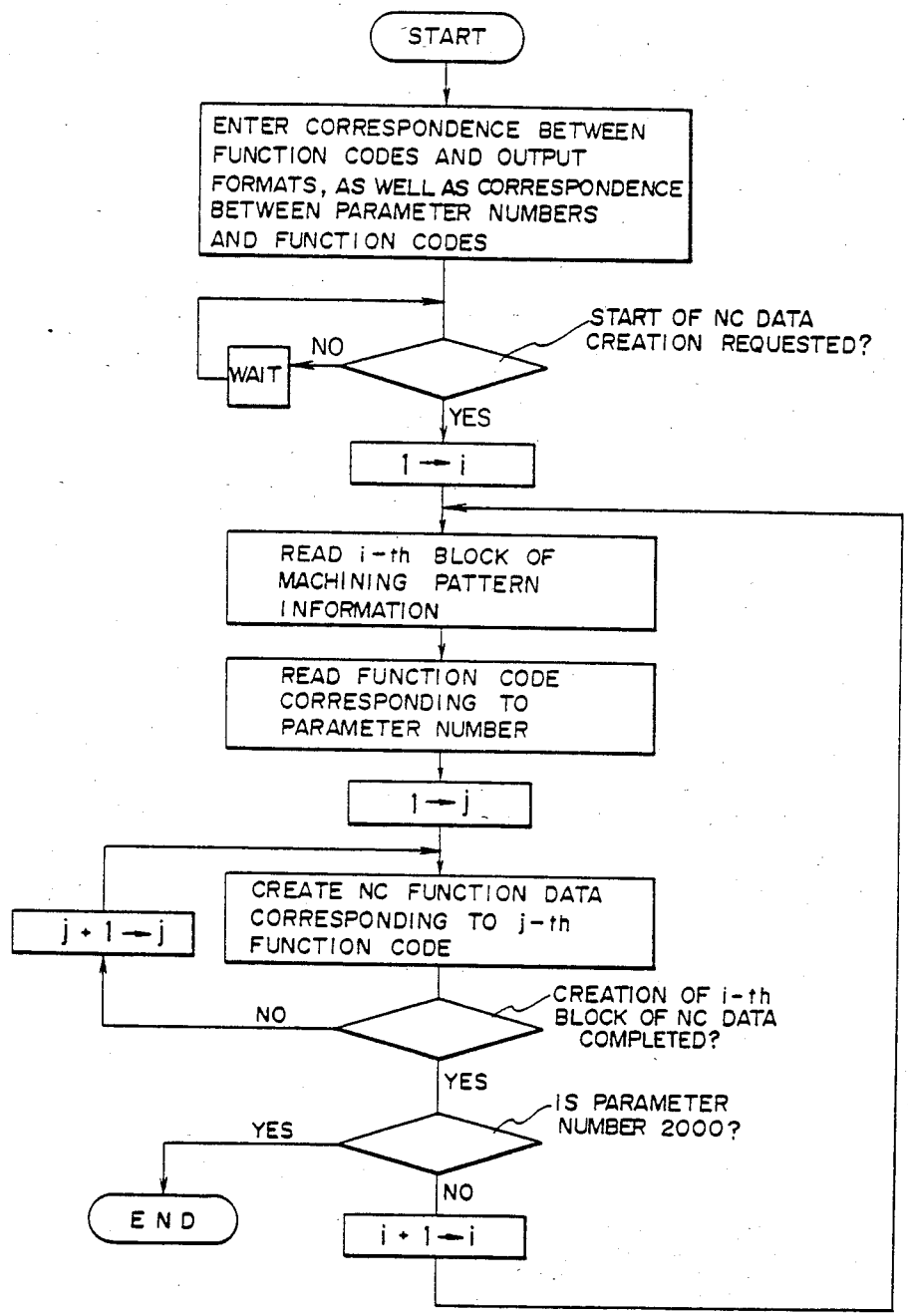
FIG. 2 is a flow chart for the processing of the present invention.

Reference will now be had to the flowchart of FIG. 2 to describe a case where NC data for the turning machining shown in FIG. 4 is created.

(1) First, the correspondence (see FIG. 5) between the parameter numbers P2000 through P2034 and the one or more function codes F1 through F9 associated with these parameter numbers is stored in the RAM 104, and the correspondence (see FIG. 6) between each of the function codes and NC data output formats is stored in the RAM 105.

(2) When the operator's panel 108 gives an indication calling for the start of NC data creation, the processor 102 reads a machining pattern, which is formed of the parameter numbers, out of the machining pattern information output unit 103 in block-by-block fashion. Machining pattern data shown below enters the processor 102 from the output unit 103 in sequentially block by block form:

| | |
|---|---|
| P2000, program number; | ⎫ ... (a) |
| P2016, [Xr], [Zr], [Sr]; | ⎭ |
| P2017, [Xt], [Zt], rapid traverse, absolute; | ... (b) |
| P2004; | ⎫ |
| P2016, [Ta]; | ⎬ ... (c) |
| P2024, [Sa]; | ⎭ |
| P2018, [Xa], [Za], rapid traverse | ... (d) |
| P2017, linear cutting position data, [Fa]; | ⎫ ... (e) |
| ... | ⎭ |
| P2020 arc cutting position data, [Fa]; | ⎫ ... (f) |
| ... | ⎭ |
| P2019, [Xt], [Zt], rapid traverse; | ... (g) |
| P2011; | ... (h) |
| P2017, [Xr, Zr], rapid traverse; | ... (i) |

The following are input to the processor together with the parameter numbers: the program number, co-ordinate values [Xr], [Zr], [Xa], [Za], [Xt], [Zt] of the important points, tool code number [Ta], S-code numbers [Sr], [Sa], information indicative of rapid traverse or cutting feed (cutting feed speed is indicated by [Fa]), cutting contour data, data indicative of an absolute command or incremental command, etc.

(3) Each time one block of machining pattern data is read, the processor 102 goes to the RAM 104 and reads into the working memory 107 the function code group corresponding to the parameter number contained in the block of data. Thereafter, the processor 102 goes to the RAM 105 and reads out the output format of each function code, creates NC data and writes the NC data into the NC data memory 106.

Thus, when the first block of machining pattern information is read, the processor 102 goes to the RAM 104 to read out the following function code group indicated by the parameter number P2000:

"0300, 0104, 0004, 0603, 0004, 0000, 0000, 0000, 0000, 0000, 0000"

The processor sets these in the working memory 107. Next, by referring to the NC data output format (feed output) indicated by the first function code "0300", the processor stores a feed code or space code of three units in the NC data memory (RAM) 106.

Thereafter, the processor 102 refers to the output format (output of % code) indicated by the second function code "0104" and stores the % code in the RAM 106. When the output of the % code is completed, the processor 102 refers to the output format (output of EOB [end of block] code) indicated by the third function code "0004" and stores the EOB code in the RAM 106. The processor then refers to the output format (program number output) indicated by the fourth function code "0603" and stores in the RAM 106 the letter of the alphabet "O", which indicates that the numerical to follow it is a program number, as well as the program number, which is contained in the first block of machining pattern information. After the output of the program number, the processor 102 outputs the EOB code in response to the fifth function code "004". When the data corresponding to all of the function codes read out of the working memory 107 are subsequently delivered as outputs in the foregoing manner, NC data conforming to one block of machining pattern information will have been stored in the RAM 106. It should be noted that NC data indicative of a three-unit feed code % EOB O 1001 EOB are created by the foregoing processing.

When the creation of NC data based upon the first block of machining pattern information ends, the processor 102 reads the next block of machining pattern information out of the machining pattern information output unit 103, stores the information in the working memory 107 and executes processing just as described above. Specifically, the processor 102 goes to the RAM 104 to read out the following function code group corresponding to the parameter number P2016 of the second block, and stores the code group in the working memory 107:

"4402, 1101, 0001, 0303, 0004, 0002, 0103, 0004"

The processor then refers to the NC data output format (output of G50) indicated by the first function code "4402".

Next, the processor 102 refers to the NC data output format (X-axis position data output) indicated by the second function code "1101" and stores in the RAM 106 the letter of the alphabet "X", which indicates that the numerical value to follow it is a position along the X axis, as well as the X-axis position [Xr], which is contained in the second block of machining pattern information. Thereafter, the processor 102 refers to te NC data output format (Z-axis position data output) conforming to the third function code "0001" and stores in the RAM 106 the letter of the alphabet "Z", which indicates that the numerical value to follow it is a position along the Z axis, as well as the Z-axis position [Zr], which is contained in the second block of machining pattern information.

Next, the processor 102 generates an EOB code in response to the fourth function code "004", stores the code in the RAM 106, refers to the NC data output format (output of G00) of the fifth function code "0002" and stores "G00" in the RAM 106. After the "G00" output, the processor refers to the output format (output of T-code) of the sixth function code "0103". However, since the second block of machining pattern information does not contain a tool number, no output is produced and the processor produces an output of an EOB code in response to the seventh function code "0004", thereby ending processing for creating NC data in accordance with the second block of machining pattern information. Through the foregoing processing, the following NC data are created and stored in the RAM 106:

G50 X[Xr]Z[Zr]EOB G00 EOB

When processing for creating the NC data in accordance with the second block of the machining pattern ends, the third block of machining pattern information is read from the machining pattern information output unit 103. The processor 102 goes to the RAM 104 to read out the following function code group corresponding to the parameter number P2017:

"0000, 0000, 5202, 5002, 1101, 0001 0503, 0004"

The processor sets these in the working memory 107. Then, when an output format corresponding to each and every function code is read and the output format includes X-axis position data output, NC data is created and delivered as an output with the X-axis coordinate value [Xt] of the tool change point Pt, which is input together with the parameter P2017, being disposed after the letter of the alphabet "X". Likewise, when the output format includes Z-axis position data output, NC data is created and delivered as an output with the Z-axis coordinate value [Zt] of the tool change point Pr being disposed after the letter of the alphabet "Z". It should be noted that the function code "0000" is a meaningless code which does not specify an operation, and that "5202" is a function code (FIG. 6) for outputting G90 or G91. Since "absolute" is commanded, "G90" is output. Further, "5002" is a function code for outputting G00 or G01. Since rapid traverse is commanded, "G00" is delivered as the output. Also, "0503" is a function code for outputting feed speed, and "0004" is a function code for outputting the EOB code. Naturally, "rapid traverse" and "absolute" in the machining pattern information are specified by codes.

In response to the third block of machining pattern information, therefore, the following are created and stored in the RAM 106:

G90 G00 X[Xt]Z[ZtL9 EOB

Thenceforth, and in similar fashion, the processor 102 creates NC data based on the fourth, fifth and successive blocks of machining pattern information and stores the data in the RAM 106. The end result is that the following NC data are created and stored in the NC data memory 106:

| | |
|---|---|
| Three-unit feed code % EOB O 1001 EOB | ... P2000 |
| G50 X[Xr] Z[Zr] S[Sr] EOB G00 EOB | ... P2016 |
| G90 G00 X[Xt] Z[Zt] EOB | ... P2017 |
| T[Ta] EOB | ... P2016 |
| G97 S[Sa] M03 EOB | ... P2024 |
| G90 G00 X[Xa] Z[Za] M08 EOB | ... P2018 |
| G90 G01 X. . . Z. . . F[Fa] EOB | ⎱ |
| ... | ⎰ ... P2017 |
| G90 G02 X. . . Z. . . I. . . J. . . F[Fa] EOB | ⎱ |
| ... | ⎰ ... P2020 |
| G90 G00 X. . . Z. . . M09 EOB | ... P2019 |
| G40 EOB M01 EOB | ... P2011 |
| G90 G00 X[Xr] Z[Zr] EOB | ... P2017 |

When the machining pattern information output unit 103 delivers the parameter P2001 indicating the end of the machining pattern information, processing conforming to this parameter is performed to complete the NC data creation processing.

Though a case has been described wherein the parameter numbers are generated by the machining pattern information output unit 103, the present invention is not limited to such an arrangement. Specifically, without entering parameter numbers from the machining pattern information output unit, one may enter only conditions necessary for deciding parameter numbers for starting and ending machining, approach retraction and the like, as well as the coordinate values of important points, spindle r.p.m. and T-code numbers. The processor 102 can then be made to generate the parameter numbers using these conditions.

There are situations where a user wishes to add a special function to a machine tool or have a machine tool execute control peculiar to the user's needs. Where this is the case, the tape format will differ from the standard NC tape format. According to the present invention, however, an NC tape can be created with ease in a desired NC tape format by setting beforehand function codes capable of accommodating all tape formats, and changing the correlation between the parameter numbers and various function codes in accordance with the desired tape format. Further, an NC tape format can be changed by changing the numerical control data output format based on a function code.

According to the present invention, an NC tape having any tape format can be created with facility, and a user need not purchase an NC tape creation unit whenever a tape format is to be changed. This is advantageous in terms of cost. Accordingly, the present invention is well-suited for application to an apparatus for creating NC data automatically.

We claim:

1. A method of automatically creating numerical control data characterized by providing a number of parameters used for specifying a machining pattern and a number of function codes designated by said parameters for creating numerical control data, said method comprising the steps of:

storing a correspondence between each of the function codes and a numerical control data output format;

storing correspondence between each parameter and one or more function codes designated by said parameter;

generating said parameters sequentially in accordance with said machining pattern; and creating numerical control data using function codes designated by said generated parameters.

2. A method of automatically creating numerical control data according to claim 1, further comprising the step of changing the numerical control output data format by changing the correspondence between parameters and function codes.

3. A method of automatically creating numerical control data according to claim 1, further comprising the step of entering, together with said parameters, data necessary for creating numerical control data.

4. A method of automatically creating numerical control data according to claim 3, wherein said data entered together with said parameters includes at least target position data along each axis, cutting path data and cutting feed speed data.

5. A method of automatically creating numerical control data according to claim 4, wherein at least the following are designated by said function codes: NC data output for path control, various G-code outputs, various M-code outputs, T-code output, S-code output and end-of-block code output.

6. A method of automatically creating numerical control data according to claim 1, further comprising the step of:

changing the numerical control output data format by changing a numerical control data output format based on said function codes.

7. A method for automatically creating numerical control data in an apparatus including a memory for storing a correspondence between function codes and parameters specifying a desired machining pattern and for storing a correspondence between each function code and an associated numerical control output data format, and including a processor for accessing the memory and generating the numerical control data, said method comprising the steps of:

a. defining the desired machining pattern;

b. generating parameters in accordance with the desired machining pattern;

c. determining the function codes associated with each parameter;

d. determining the numerical control output data format associated with each determined function code; and e. generating numerical control data in accordance with the determined numerical control output data format and the generated parameters.

* * * * *